United States Patent [19]

Meyer et al.

[11] 3,919,976
[45] Nov. 18, 1975

[54] LIVESTOCK ENCLOSURE

[76] Inventors: Clarence J. Meyer; Daniel J. Meyer, both of Rural Rte. No. 1, Monona, Iowa 52159

[22] Filed: July 10, 1974

[21] Appl. No.: 487,009

[52] U.S. Cl. .................................. 119/16; 119/28
[51] Int. Cl.[2] ................................ A01K 1/00
[58] Field of Search ................................ 119/16–28

[56] References Cited
UNITED STATES PATENTS

| | | | |
|---|---|---|---|
| 2,735,400 | 2/1956 | Stubbs | 119/18 |
| 3,021,819 | 2/1962 | Krahn | 119/22 |
| 3,191,577 | 6/1965 | McMurray | 119/16 |
| 3,224,414 | 12/1965 | Conover | 119/28 |
| 3,229,663 | 1/1966 | Conover | 119/16 |
| 3,229,665 | 1/1966 | Baltz | 119/52 AF |

*Primary Examiner*—Hugh R. Chamblee
*Attorney, Agent, or Firm*—Hugh H. Drake

[57] ABSTRACT

A livestock enclosure is bounded by a generally-circular upright wall covered by a roof. Centrally located is a pit for receiving defecation and other litter. An annular imperforate floor extends outwardly from the pit toward the wall and is exposed for direct access to and walking upon by the livestock. An elongated sweep means radially extends from a pivotal mount at the pit center for lateral movement circularly around and over the floor in order to engage litter on the floor and propel the same toward and into the pit. Surrounding the swept floor but still within the enclosure is a nesting region. For inducing the livestock to defecate only on the swept floor, the nesting area is raised above the level of the floor and air circulation is caused to occur so as to encourage the livestock to respect their nesting region. Various structural arrangements are included to facilitate supply of the enclosure materials in a form that permits easy erection by the user without the need for specialized tools or equipment.

20 Claims, 13 Drawing Figures

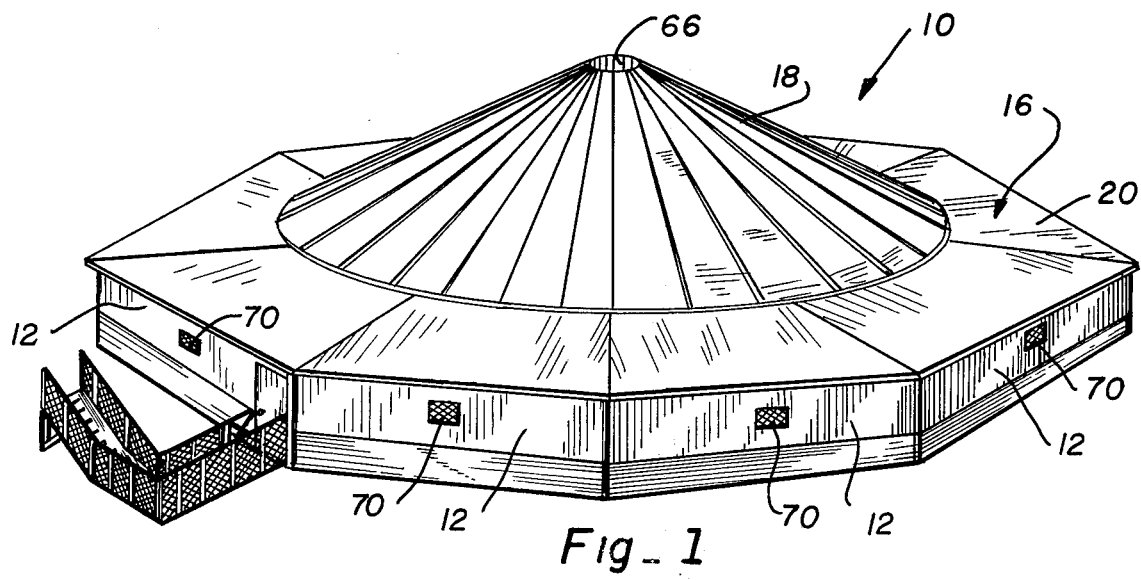
Fig_1
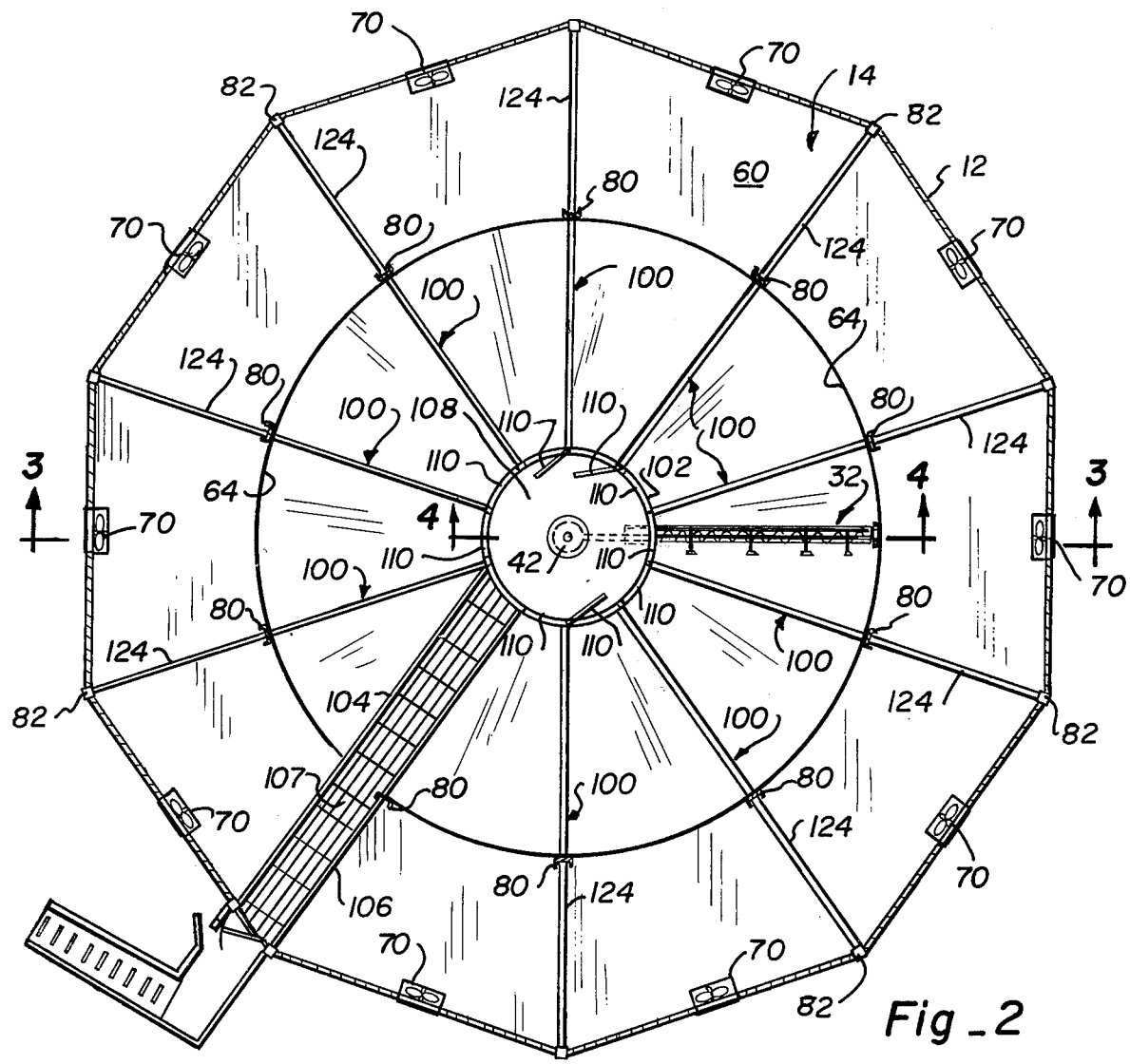
Fig_2

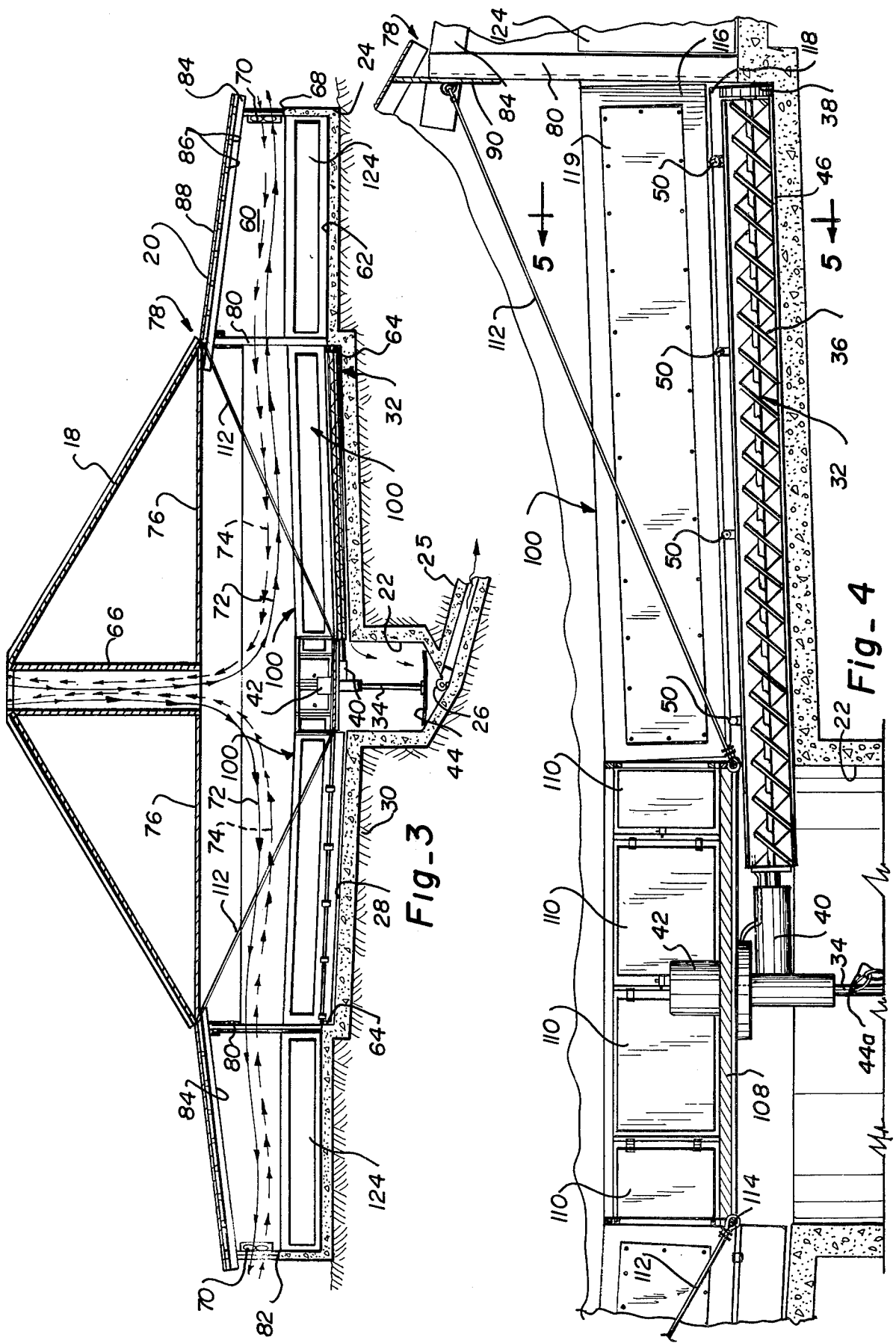

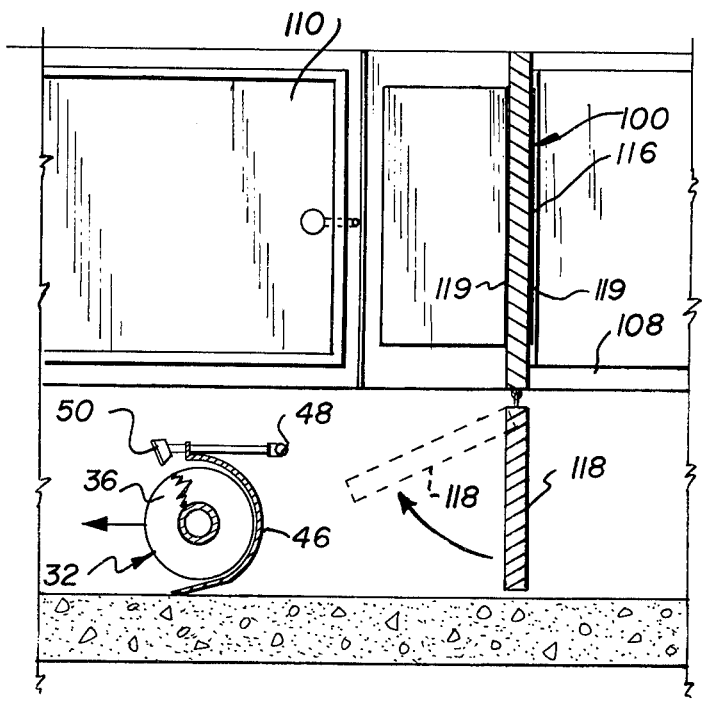
Fig_5
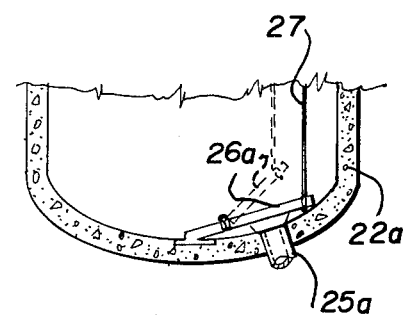
Fig_3a
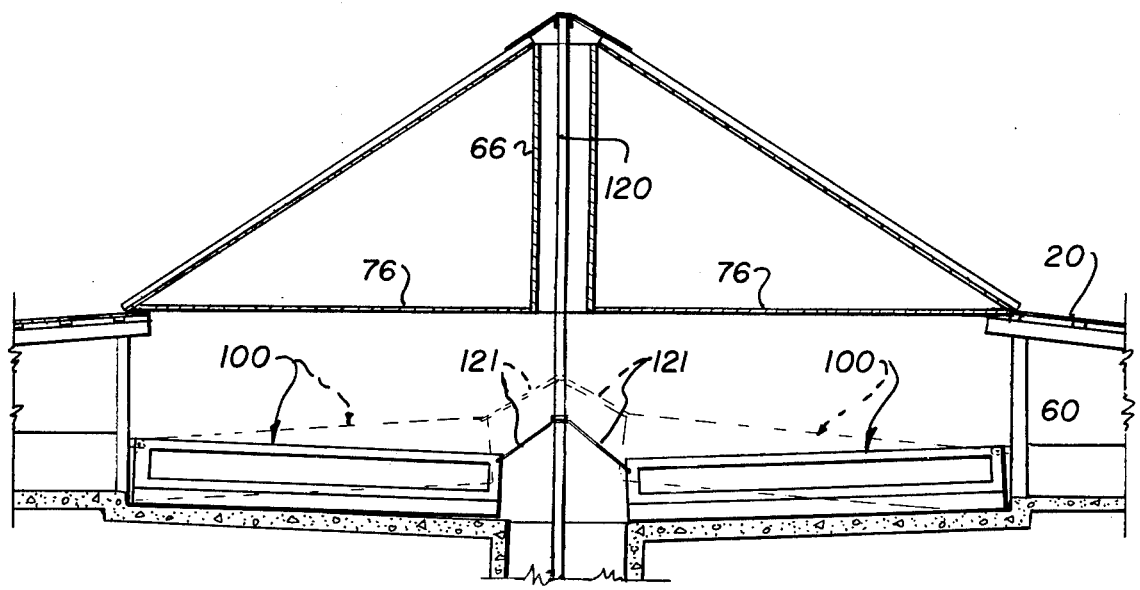
Fig_6

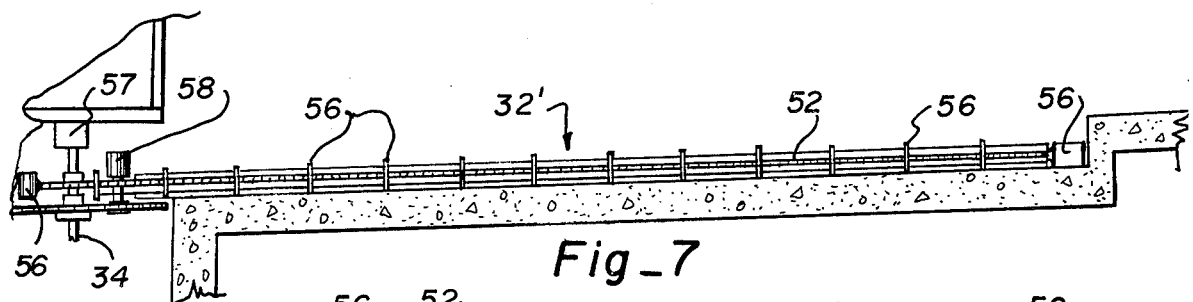
Fig_7
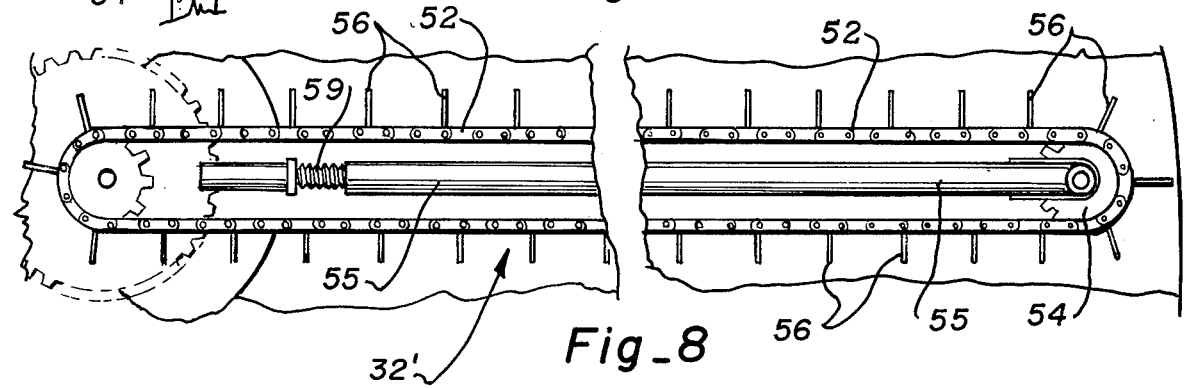
Fig_8
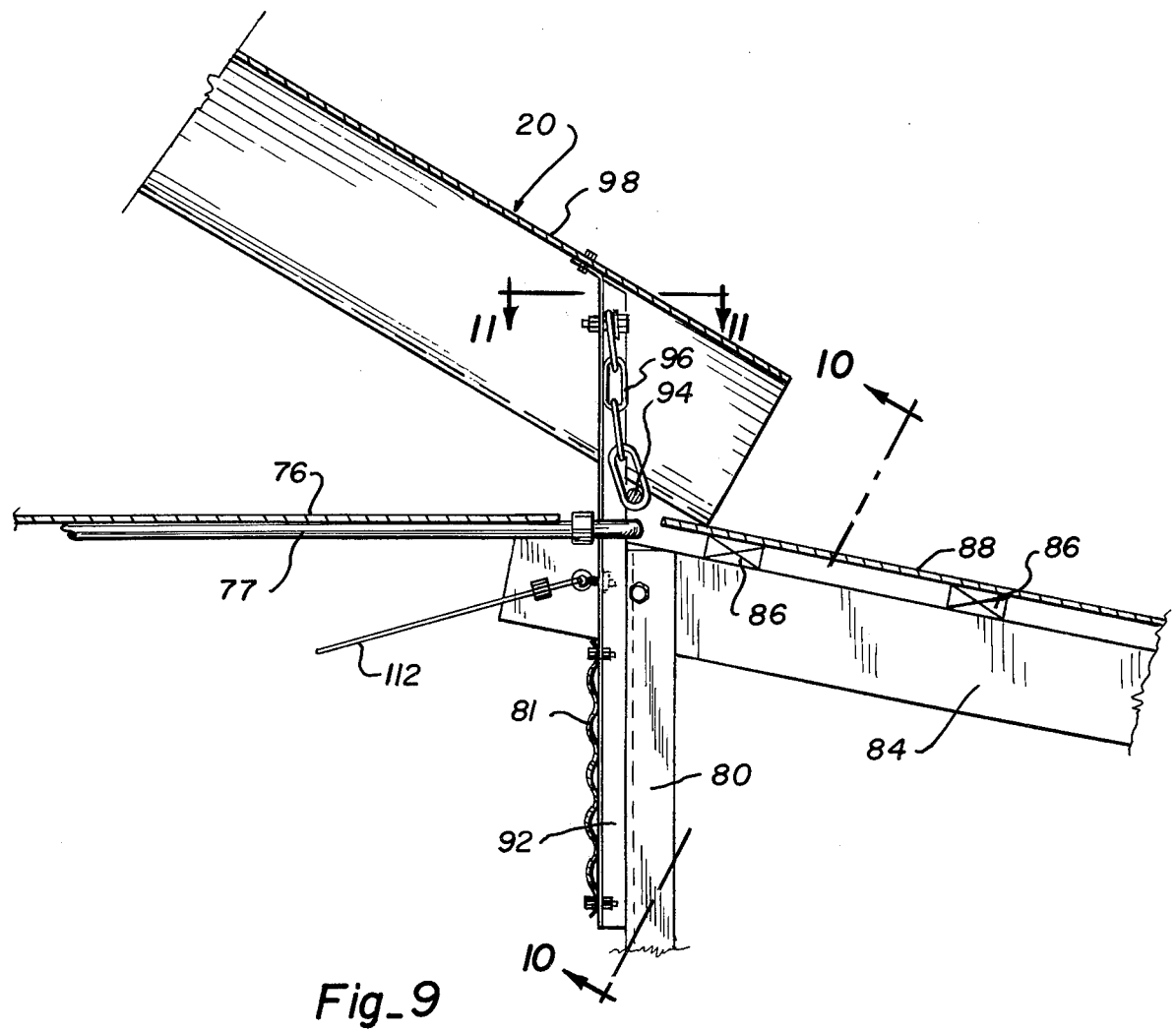
Fig_9

LIVESTOCK ENCLOSURE

The present invention pertains to livestock enclosures. More particularly, it relates to a livestock enclosure which enables the maintenance of a healthful environment while yet being of a design that permits erection from what amounts to a kit of parts without the need for special equipment.

Particularly as concerned with the farrowing and raising of pigs, it has heretofore been appreciated that an at least generally-circular building, for housing the pigs, tends toward efficiency in terms of the cost of the enclosure materials as against the resultant area of the enclosure and the expense of other equipment. Thus, a number of prior hog houses have been of circular or polygonal shape, having their interiors divided into a plurality of at least somewhat pie-shaped sections by means of radially-extending pen walls.

With any such confinement of livestock, it quickly becomes apparent that the frequent removal of defecation and other litter is highly desirable for the purpose of reducing the spread of disease and otherwise gaining a healthful atmosphere. To that end, a number of prior approaches have involved the implacement of trenches or sumps beneath the enclosure floor and covered by heavy grates or other foraminous medium. In an extension of the concept of utilizing a grate structure, U.S. Pat. No. 3,191,577 — McMurray discloses the use of a foraminous floor, upon which the livestock tread, over the entire area occupied by the livestock. Beneath that foraminous floor is a second, solid floor upon which the litter deposited through the openings is deposited. A flexible auger, centrally pivoted, is caused to sweep the lower floor and propel litter into a centrally-located sump.

An evolutionary series of hog houses are disclosed in U.S. Pat. Nos. 3,148,663, 3,283,744, 3,306,257, 3,530,831 and 3,726,254, all in the name of a William J. Conover. Each of these successive disclosures takes advantage of a generally circular configuration, and the end result of the evolution of this design is a multi-tiered structure particularly designed for the flushing away of waste.

The foregoing approaches generally envision the division of the enclosed area into a plurality of pie-shaped or wedge-shaped pens. Because the pen dividing walls are entirely stationary and fixed, the attendant sanitary arrangements involve either fixed flushing facilities located exteriorly of the pen walls or, as in the aforementioned McMurray patent, an added sweeping assembly disposed entirely below the pens. In a somewhat different approach, U.S. Pat. No. 3,343,521 — Moores discloses the use of a circular sweep and hopper which scrapes away existing litter while at the same time dispensing a new layer of straw or the like in a generally circular enclosure. Swept litter is move circularly around the enclosure until it reaches a conveyor that propels the litter toward the outer periphery of the enclosure where it is ejected through an opening therein. This arrangement does not and cannot contemplate usage with stationary dividing pen walls as in the McMurray and Conover patents.

While the aforementioned prior art offers various advantages in the raising of livestock such as swine, it suffers from excessive cost of construction and installation. For example, the structure disclosed in the McMurray patent requires the installation of a raised floor that must be capable of supporting the very substantial weight of the livestock housed within the enclosure. Moreover, any approach which depends upon grates or other foraminous structure, to support the livestock while yet passing the defecation and other litter, necessarily includes solid portions upon which the defecation may remain and thus contribute to the possible harboring of disease-bearing organisms. The structural evolution evidenced by the series of Conover patents leads inherently to a highly-expensive structure which is generally of a kind requiring production of its component parts only in a heavy sheet-metal facility or factory together with the attendant requirement of the need for heavy machinery and equipment at the erection site for the purpose of assemblying the building. None of these prior approaches leads particularly toward a type of construction that might be sold to the livestock raiser in "kit" form and then erected by him through the use of only ordinary farm-type tools and implements.

It is, accordingly, a general object of the present invention to provide a new and improved livestock enclosure which overcomes at least some of the deficiencies and undesirable attributes of prior such enclosures as those adverted to above.

It is a specific embodiment of the present invention to provide a livestock enclosure of a kind which may be packaged and sold in more or less "kit" form and readily assembled by the purchaser.

It is a related object of the present invention to provide a new and improved livestock enclosure which is capable of being fabricated from conventional and readily-available materials.

It is another object of the present invention to provide a new and improved livestock enclosure which aids in the maintenance of healthful conditions for the livestock while yet affording flexibility and ease of operation and use.

A further object of the present invention is to provide a new and improved livestock enclosure which includes structural arrangements that permit the use of light-weight materials while yet retaining a high degree of structural strength.

A still further specific object of the present invention is to provide a new and improved livestock enclosure so arranged and facilitated that the livestock are encouraged to live basically in one nesting region while defecating in a different area within the enclosure.

A livestock enclosure constructed in accordance with the present invention includes a generally-circular upright wall that encloses a livestock raising area. Covering that area is a roof. A pit is located centrally of the area and extends beneath the level of the lower perimeter of the wall. An annular imperforate floor lies beneath the roof and is exposed for direct access to and walking upon by the livestock. The floor extends outwardly from the upper perimeter of the pit toward the wall. An elongated, radially-extending sweep means, pivotally mounted at the center of the pit for lateral movement circularly around and over the floor, engages litter on the floor and propels the same toward and into the pit. Finally, there is included means for driving the sweep means in its lateral movement and in its propelling of the litter into the pit. Various improvements include agitation of litter held in the pit, forming an external nesting region externally around the swept area, arrangements that encourage the livestock to defecate only in the swept region and not in the nesting region and a wall and roof assembly which facilitates construction by the use of only ordinary and conventional materials and equipment.

The features of the present invention which are believed to be novel are set forth with particularity in the appended claims. The organization and manner of operation of the invention, together with further objects and advantages thereof may best be understood by reference to the following description taken in connection with the accompanying drawings, in the several figures of which like reference numerals identify like elements, and in which:

FIG. 1 is a perspective external view of a livestock enclosure embodying the present invention;

FIG. 2 is a plan view of the embodiment of FIG. 1, the roof and other overhead structure being removed;

FIG. 3 is a cross-sectional view taken along the line 3—3 in FIG. 2;

FIG. 3a is an enlarged cross-sectional view of a modification of a portion of the structure shown in FIG. 3;

FIG. 4 is an enlarged cross-sectional, fragmentary view taken along the line 4—4 in FIG. 2;

FIG. 5 is a simplified and enlarged fragmentary cross-sectional view taken along the line 5—5 in FIG. 4;

FIG. 6 is a fragmentary cross-sectional view similar to FIG. 3 but showing an alternative embodiment of a portion of the structure;

FIG. 7 is a fragmentary side-elevational view of an alternative portion of the embodiment shown in FIGS. 2–5;

FIG. 8 is a fragmentary plan view of the apparatus shown in FIG. 7;

FIG. 9 is an enlarged fragmentary cross-sectional view showing a detailed portion of the embodiment of FIGS. 1–5;

Figure 11:
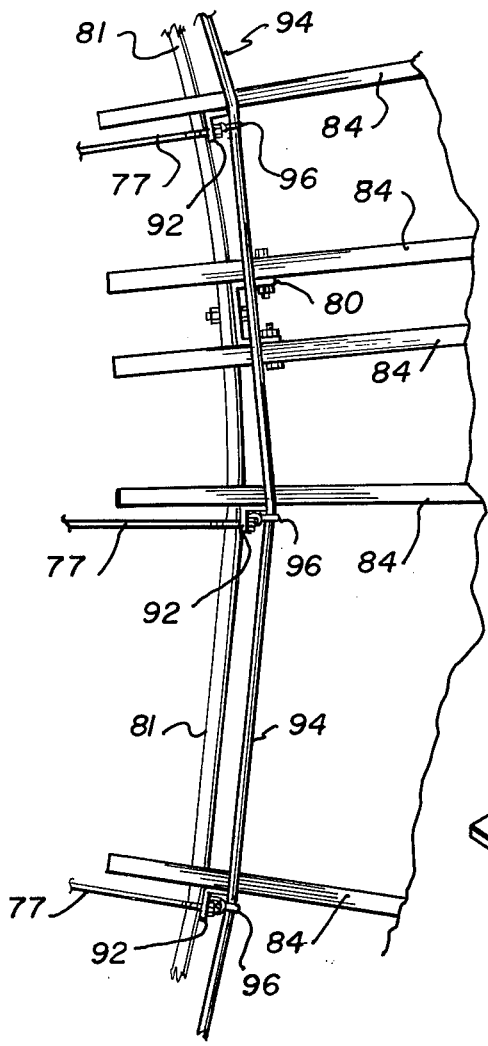
FIG. 11 is a fragmentary cross-sectional view taken along the line 11—11 in FIG. 9.

As specifically disclosed herein, a livestock enclosure 10 includes a generally-circular upright wall 12 that encloses a livestock raising area 14. Ideally from the standpoint of maximizing the enclosed area as against the required number of feet of perimeter wall, wall 12 would be truly circular in configuration. To accommodate more-conventionally-available standard wall materials, however, wall 12 is shown as being of multifaceted polygonal construction so as to be composed of a succession of straight sections. Covering area 14, enclosed by wall 12, is a roof 16. Roof 16 includes a first, central portion 18 in the shape of an inverted cone and a second portion 20 annularly surrounding portion 18.

As best seen in FIG. 3, a pit 22 is located centrally of area 14 and extends beneath the level of the lower perimeter 24 of wall 12. Extending outwardly of the enclosure from the bottom of pit 22 is a drain conduit 25 which connects with an external septic tank or other sewage disposal system. If desired, an auger or like feed system may connect from the bottom of pit 22 to an exterior above-ground point at which drainage from pit 22 may be emptied into a tank wagon or other vehicle for transport elsewhere. In any event, the entrance to conduit 25 is selectively closed by a valve 26. As shown in FIG. 3, valve 26 is simply a plug having an eye so as to enable its being pulled by an operator standing above the pit and using a pole or the like with a hook on the end. Alternatively as shown in FIG. 3a for a slightly modified pit 22a which is drained by a conduit 25a, the valve is in the form of a flap 26a hingedly mounted at one end and operable by means of an upwardly extending rod 27. Dashed outline is used to represent the open position. Flap 26a may carry a plug aligned to fit into the end of conduit 25a upon valve closure. Rod 27 may be operated manually or by a float.

An annular imperforate floor 28 lies beneath roof portion 18 and extends outwardly from the upper perimeter of pit 22 toward wall 12. Floor 28 is preferably of poured concrete disposed on a suitable gravel base and in turn laid directly upon the underlying ground 30.

An elongated sweep 32 extends radially from and is pivotally mounted upon a vertical rod 34. In the form shown in FIGS. 3–5, sweep 32 includes an auger 36 upon the shaft of which a wheel 38 is carried at the outer end of the auger so as to permit lateral movement of the auger circularly around and over floor 28. At the other end of its shaft, auger 36 is driven through a T-gear 40 by a motor 42 so as to drive sweep 32 in its movement around and over the floor and cause rotation itself of auger 36 as well as to rotate rod 34. thus, auger 36 is enabled to engage litter on floor 28 and propel the same toward and into pit 22.

In this environment, it will be understood that such litter is composed primarily of defecation from the enclosed livestock. Accordingly, pit 22 becomes filled with a combination of such defecation and other liquid, including any flushing liquid. For the purpose of insuring better drainage from pit 22 into conduit 26, an agitator 44 is secured at the lower end of rod 34 so as to be caused to move within the mass deposited in pit 22 as the rod is rotated by motor 42 in movement of sweep 32. In the form of FIG. 3, agitator 44 includes three radially extending strips of flexible but hard rubber each about three inches wide and one inch thick and which effectively sweep the lower portions of the wall of pit 22 upon rotation of rod 34. Alternatively or in addition, chains 44a, as depicted in FIG. 4, may trail downwardly from rod 34. In any case, the agitator serves to mix or stir the solids into the liquid during operation of sweep 32. Preferably, valve 26 is maintained in a closed condition until the cleaning operation is completed and the contents of pit 22 have become fluid in consistency.

As shown most clearly in FIG. 5, auger 36 is held in nested relationship to a blade 46 the lower edge of which is disposed adjacent to floor 28 so as to be in a position to gather the litter as sweep 32 is moved laterally. Extending alongside blade 46 is a conduit 48 from which extend a plurality of nozzles 50 that are spaced along sweep 32 in order to deliver a fluid wash in aid of the action of the sweep. Floor 28 slants downwardly toward pit 22 so as both to accommodate flow of such rinsing fluid as well as to aid sweep 32 in its function of propelling the debris toward and into pit 22.

As shown in FIGS. 7 and 8, an alternative sweep 32′ includes an endless conveyor having a chain 52 gear-connected to rod 34 in driving relationship and supported at its other end by an idler gear 54 carried by a support arm 55. A succession of paddles 56 project outwardly from chain 52 so as to be individually disposed perpendicularly and adjacent to floor 28 in a position to engage and sweep the litter into pit 22. A first motor 57 drives chain 52 and rod 34, while a second motor 58 rotates the whole sweep assembly through the illustrated gearing secured to one end of arm 55. A take-up screw 59 included in arm 55 permits adjustment of chain tightness. If desired, leading and trailing wheels may be bracketed to the shaft of idler gear 54 so as to permit easier lateral sweep movement.

In one successful embodiment, paddles 56 are formed of rigid sheet steel. An alternative is to use hard rubber paddles. Still differently, a radially elongated fibrous brush may be disposed with its bristle ends in contact with the floor. For convenience of access, take-up screw 59 and its assembly may instead be located in arm 55 adjacent to idler gear 54. In an operated embodiment, motors 57 and 58 have been replaced by a single motor in combination with a clutch that translates the motive power used to cause the apparatus to rotate around the axis of rod 34.

The raising area within wall 12 further includes a nesting region 60 disposed under roof 16 and specifically under outer roof portion 20. Nesting region 60 annularly surrounds imperforate floor 28 and preferably includes a nesting floor 62 constructed in the same manner as floor 28. However, nesting floor 62 has its upper surface disposed at a level above that at the outer perimeter of floor 28 so as to define a step 64.

Disposed in roof portion 18 is an upright chimney 66 that is centrally located so as to be over and above pit 22. Spaced individually around wall 12, and thus spaced around the outer circumference of nesting region 60, are a plurality of air passages 68. Fitted in each air passage 68 is a respective reversible air blower 70. Absent operation of blowers 70, air is naturally caused to enter passages 68, sweep over nesting areas 60 and the dunging area defined by floor 28 and exhaust out chimney 66. This, in itself, serves to sweep out undesirable odors and particularly to exhaust gases evolving from the contents of pit 22. The latter function is the reason for locating chimney 66 directly above pit 22. It has been found that such cleansing of the air, particularly in nesting regions 60, causes livestock such as hogs somehow to appreciate the freshness in the nesting area as a result of which they move to floor 28, subject to the action of sweep 32, for defecation. Apparently adding to the tendency of the animals to respect the sanctity of nesting region 60 as a living quarters, while using floor 28 for defecation, is the provision of step 64, so that they have to step up to enter the nesting region.

The judicious use of a blower 70 appears to augment the psychological situation by means of which the animals are encouraged to use only the area cleared by sweep 32 for defecation. During cold weather, as in the winter, blowers 70 are operated to exhaust air to the exterior wall 12 as indicated by solid arrows 72 in FIG. 3. That is, the air then passes downwardly over the swept area where it is warmed, cleansing the odors and gases and leaving the nesting area 60 the warmest. Of course, the animals tend to have respect for their places of residence in the warmest area during such times. On the other hand, during hot weather, it has been found advantageous to reverse the direction of operation of blowers 70, or at least to de-energize the blowers, so that the air is forced into the interior of the enclosure and caused to exit from the upper end of chimney 66 as indicated in FIG. 3 by dashed arrows 74. It is believed that the relative coolness and freshness of region 60 during such hot weather operation again tends to engender respect for region 60 as a living area and contribute to the development of habit in the animals that causes them to restrict their defecation to the more central area defined by floor 28.

As already noted, central portion 18 of roof 16 is in the shape of an inverted cone. Underlying cone portion 18 is a generally horizontal ceiling 76. Ceiling 76, thus, defines the base of the cone. Chimney 66 is suspended from the roof at an opening therein which effectively constitutes the apex of the cone. The chimney extends to an opening in ceiling 76. The latter is supported by cables 77 stretched between the upper end portions of structure that also supports roof 16. These cables also assist in balancing chimney 66.

The second portion 20 of roof 16, which is disposed above nesting region 60 and annularly surrounds first portion 18, is inclined downwardly and outwardly from the outer perimeter 78 of first roof portion 18. A plurality of upright posts 80, spaced successively around outer periphery 78 and the corresponding inner periphery of second roof portion 20, individually support respective segments of a continuous band or ring 81 which, in turn, supports roof portion 20 at its inner periphery. A similar plurality of upright posts 82, spaced successively around the circumference of wall 12, serve to support the lower and outer end of roof portion 20. In itself, roof portion 20 may be of any conventional construction. As shown in FIGS. 3 and 9, it includes a succession of laterally spaced rafters 84 across which extend bracing strips 86 on top of which, in turn, is disposed a covering 88 which preferably is both moisture proof and of insulating quality.

Figure 10:
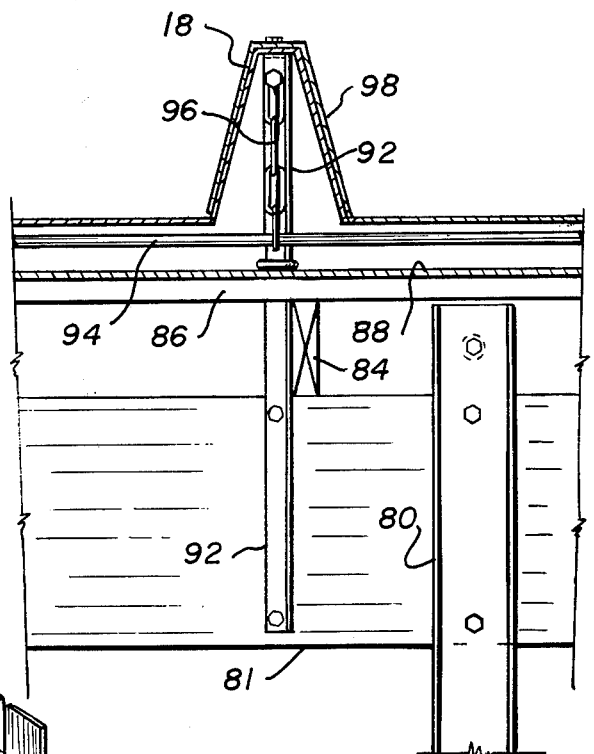
FIG. 10 is a fragmentary cross-sectional view taken along the line 10—10 in FIG. 9.
Figure 12:
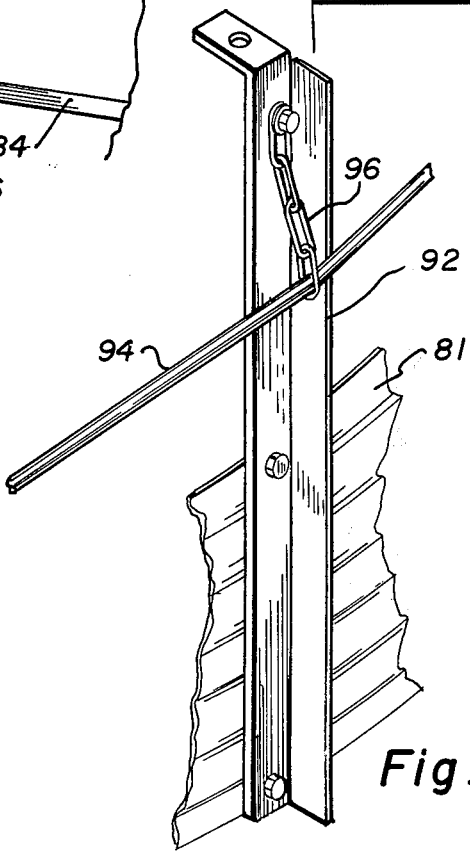
FIG. 12 is an enlarged fragmentary perspective view of a portion of the structure shown in FIGS. 9–11.

Continuous band or ring 81 encircles the area defined by floor 28. Conveniently, band 81 is of corrugated galvanized iron material as conveniently used in the construction of circular feed bins. Projecting upwardly from and spaced successively around band 81 are a plurality of vertical stems 92 each of which is individually supportingly secured to respective segments of roof portion 18 at the outer periphery thereof. That is, stems 92 are spaced successively around the outer periphery of portion 18 and the inner periphery of portion 20. However, each of stems 92 is constructed of a simple and small length of ordinary angle iron as a result of which stems 92, collectively, have insufficient lateral bending strength to resist the weight of roof portion 18. Nevertheless, stems 92 are enabled to support roof portion 18 by reason of the inclusion in the assembly of a flexible cable 94 that encircles all of stems 92 at the point between roof portions 18 and 20 and preferably at the upper end of stems 92, cable 94 being tensioned in resistance of any bending of stems 92 outwardly of the overall enclosure. For convenience of assembly, cable 94 is suspended in place by means of short lengths of flexible chain 96. It will be observed in FIG. 10 that roof portion 18 is conveniently fabricated as a series of individual cone sectors 98 each having a flange portion that is matingly secured to that of the next.

Enclosure 10 further includes a plurality of dividers 100 each of which extends radially from the upper perimeter of pit 22 and which together define an annular succession of generally wedge-shaped pens for the livestock. As illustrated, the inner ends of each of dividers 100 terminate at about the outer periphery of pit 22, and there is the further inclusion of a fence 102 from which the dividers are suspended and which circumscribes the approximate outer periphery of pit 22. One pair of dividers 104 and 106 are spaced side-by-side to define an alley that leads from the periphery of the enclosure, and thus also from the periphery of floor 28, to the space above pit 22. The alley also includes a bottom or floor 107 that is suspended by dividers 104 and 106 so as to be positioned above floor 28 and provide clearance for movement of sweep 32. A cover or platform 108, of a strength to support the animals, is disposed over pit 22. A plurality of gates 110 are included in fence 102 and are individually openable into the region above pit 22 floored by cover 108 so as to permit the access of livestock from the area over pit 22 into different ones of the pens defined by dividers 100; this facilitates sorting of the animals. While depicting in solid form, gates 110 desirably may be made of wire paneling. A corresponding plurality of ties 112 are successively spaced around floor 28 and individually extend from the lower end of fence 102 in tension to the upper ends of corresponding ones of support posts 80 at the outer periphery of portion 18 of the roof. Ties 112 serve to suspend both the inner ends of dividers 100 and cover 108 in positions above the level of floor 28 in order to accommodate movement of sweep 32.

As best shown in FIG. 5, each of the dividers 100 includes a fixed panel 116 the bottom edge of which is spaced above floor 28 by a distance accomodating movement of sweep 32 thereunder. Hingedly suspended from each such panel 116 is a swinging panel 118 that is of a weight which precludes self-movement of the younger ones of the contained livestock therethrough. For swine, panel 118 need only be a two by six inch piece of ordinary lumber for the case in which it is approximately 21 feet in length. Preferably, it is weighted so as to be in the order of 68 pounds. However constructed, panel 118 precludes self movement therethrough of the younger ones of the livestock, otherwise of a size to be able to move under panel 116, while yet permitting movement of sweep means 32 in its cleaning operation. Fixed panel 116 preferably is covered on both sides by sheet metal facing 119.

It will thus be seen that at least a portion of each of dividers 100 is moveable to accommodate movement of sweep 32 thereunder. In a possible alternative arrangement, each of a similar plurality of dividers may be arranged to be raised in order to accommodate movemet of sweep 32. In that case, a winch or other suitable means is affixed by means of a cable to the dividers so as to raise at least their inner ends when desired to permit the operation of sweep 32; this is exemplified by dashed outline in FIG. 6. An analogous winch and cable assembly may be used for raising fence 102 and gates 110.

In a different alternative as shown with full outline in FIG. 6, the center of roof portion 18 is supported from the top of pole 120 projecting upwardly from the bottom of pit 22. Dividers 100 are then suspended from pole 120 by cables 121. Although not specifically shown in FIG. 6, platform 108 and gates 110 similarly are suspended from pole 120, either directly or from the inner ends of dividers 100. In any event, sweep 32 (or 32') then is journaled on pole 120 so as to revolve around it. In that case, agitator 44 is suspended from the sweep means and arranged to circle the pole.

As embodied herein, it is contemplated that each of dividers 100 will, in themselves, extend only to the outer periphery of floor 28 which defines the littering area. However, it is contemplated that fixed extension dividers 124 project from the outer end of each divider 100 so as to complete the formation of the wedge-shaped pens that extend all the way to outer wall 12. Thus, extension dividers 124 serve to define the sides of each successive nesting area. However, each of extension dividers 124 may be stationary inasmuch as it is beyond the scope of action of sweep 32. Preferably, feeders are installed in or adjacent to extension dividers 124. On the other hand, watering devices preferably are installed along dividers 100 so as to be over floor 28.

Perhaps most importantly, it will be observed that the entire assemblage herein disclosed includes nothing that is not conveniently available from a local machinery and equipment supplier. Accordingly, an individual livestock raiser may secure the necessary parts and assemble them so as to attain one or more of the advantages of the present invention. Moreover, the same features of the invention lead directly to the desirable possibility of supplying the livestock enclosure in what might be termed to be "kit" form. That is, all of the parts and their intercombination are such as to enable them to be collected together and shipped to the user for his ultimate erection of the livestock enclosure, a process which need not involve the use of any kind of special tools or equipment.

The end result is a livestock enclosure that affords both cleanliness in operation and substantial flexibility as to manner of use. By means of selected ventilation patterns, undesired gases and odors are readily exhausted while, at the same time, the ventilation patterns encourage the livestock to nest in one area while defecating in a different area that is cleanable through the use of readily-maintainable apparatus. Raising the nesting area above the outer perimeter of the defecating area serves as an additional incentive to the enclosed livestock to differentiate between their uses of the nesting area and the littering area. Yet, all of the foregoing is accomplished without the need for false floors, expensively manufactured structural floors or the use of expensive wall structures in order to support the necessary roof to cover both an operative disposal area and a psychologically-clean nesting area.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:
1. A livestock enclosure comprising:
a generally-circular upright wall enclosing a livestock raising area;
a roof covering the area enclosed by said wall;
a pit located centrally of said area and extending beneath the level of the lower perimeter of said wall;
an annular imperforate floor beneath said roof and exposed for direct access to and walking upon by said livestock, said floor extending outwardly from the upper perimeter of said pit toward said wall;
an elongated, radially extending sweep means, pivotally mounted at the center of said pit for lateral movement circularly around and over said floor, for engaging litter on said floor and propelling said litter toward and into said pit;
means for driving said sweep means in said movement and in said propelling of said litter;
means for draining said pit to a location outside of said enclosure;
valve means for selectively closing said draining means;
and means for agitating litter deposited within said pit.

2. An enclosure as defined in claim 1 in which said agitating means is propelled by said driving means.

3. A livestock enclosure comprising:
a generally-circular upright wall enclosing a livestock grazing area;
a roof covering the area enclosed by said wall;
a pit located centrally of said area and extending between the level of the lower perimeter of said wall;
an annular imperforate floor beneath said roof and exposed for direct access to and walking upon by said livestock, said floor extending outwardly from the upper perimeter of said pit toward extending wall;
an elongated, radially-extending sweep means, pivotally mounted at the center of said pit for lateral movement circularly around and over said floor, for engaging litter on said floor and propelling said litter toward and into said pit;
means for driving said sweep means in said movement and in said propelling of such litter;
and means defining a nesting region under said roof and annularly surrounding said imperforate floor but within said wall.

4. An enclosure as defined in claim 3 in which said nesting region has a nesting floor disposed at a level stepped above that of the outer perimeter of said imperforate floor.

5. An enclosure as defined in claim 3 which further includes an upright chimney disposed in said roof above said pit and a plurality of air passages in said upright wall and spaced individually around the outer circumference of said nesting region.

6. An enclosure as defined in claim 5 in which a plurality of air blowers are individually disposed respectively in different ones of said air passages.

7. An enclosure as defined in claim 5 in which the portion of said roof above said imperforate floor has the shape of an inverted cone, which further includes a generally horizontal ceiling underlying said portion in a position to define the base of said cone, and in which said chimney extends from an opening in said ceiling to an opening at the apex of said cone.

8. A livestock enclosure comprising:
a generally-circular upright wall enclosing a livestock grazing area;
a roof covering the area enclosed by said wall;
a pit located centrally of said area and extending beneath the level of the lower perimeter of said wall;
an annular imperforate floor beneath said roof and exposed for direct access to and walking upon said livestock, said floor extending outwardly from the upper perimeter of said pit toward said wall;
an elongated, radially-extending sweep means, pivotally mounted at the center of said pit for lateral movement circularly around and over said floor, for engaging litter on said floor and propelling said litter toward and into said pit;
means for driving said sweep means in said movement and in said propelling of said litter;
means in said raising area further defining a nesting region under said roof and annularly surrounding said imperforate floor;
a first portion of said roof, above sad imperforate floor, having the shape of an inverted cone;
a second portion of said roof, above said nesting region and annularly surrounding said first portion, being inclined downwardly and outwardly from the outer perimeter of said first portion;
a plurality of upright posts, spaced successively around the outer periphery of said first portion and the inner periphery fo said second portion, effectively supporting respective segments of said second portion at the inner periphery thereof;
a plurality of vertical stems spaced successively around the outer periphery of said first portion and the inner periphery of said second portion, individually supporting respective segments of said first portion at the outer periphery thereof, said stems collectively having insufficient lateral bending strength to resist the weigh of said first portion;
and a flexible cable encircling said stems, between said first and second portions of said roof, and tensioned in resistance of bending of said stems outwardly of said enclosure.

9. An enclosure as defined in claim 8 which further includes a band structurally encircling the upper end portions of said posts.

10. An enclosure as defined in claim 9 in which at least a portion of said stems are secured at their lower ends to and project upwardly from said band.

11. A livestock enclosure comprising:
a generally-circular upright wall enclosing a livestock grazing area;
a roof covering the area enclosed by said wall;
a pit located centrally of said area and extending beneath the level of the lower perimeter of said wall;
an annular imperforate floor beneath said roof and exposed for direct access to and walking upon by said livestock, said floor extending outwardly from the upper perimeter of said pit toward said walls;
an elongated, radially-extending sweep means, pivotally mounted at the center of said pit for lateral movement circularly around and over said floor, for engaging litter on said floor and propelling said litter toward and into said pit;
means for driving said sweep means in said movement and in said propelling of said liter;
a plurality of dividers, extending radially from said pit, that define an annular succession of generally wedge-shaped pens for said livestock, the inner ends of said dividers terminating at about the outer periphery of said pit;
a fence circumscribing the approximate outer periphery of said pit; and
a pair of said dividers being spaced side-by-side to define an alley leading from the periphery of said floor to the space above said pit, and means defining a bottom for said alley with said pair and said bottom being suspended above said floor.

12. A livestock enclosure comprising:
a generally-circular upright wall enclosing a livestock grazing area;
a roof covering the area enclosed by said wall;
a pit located centrally of said area and extending beneath the level of the lower perimeter of said wall;
an annular imperforate floor beneath said roof and exposed for direct access to and walking upon by said livestock, said floor extending outwardly from the upper perimeter of said pit towards said wall,
an elongated, radially-extending sweep means, pivotally mounted at the center of said pit for lateral movement circularly around and over said floor, for engaging litter on said floor and propelling said litter toward and into said pit;
means for driving said sweep means in said movement and in said propelling of said litter;

a plurality of dividers, extending radially from said pit, that define an annular succession of generally wedge-shaped pens for said livestock, the inner ends of said dividers terminating at about the outer periphery of said pit;

a fence circumscribing the approximate outer periphery of said pit; and a cover, supportive of said livestock, disposed over said pit together with a plurality of gates individually openable into the region above said pit respectively from different ones of said pens.

13. A livestock enlosure comprising:

a generally-circular upright wall enclosing a livestock grazing area;

a roof covering the area enclosed by said wall;

a pit located centrally of said area and extending beneath the level of the lower perimeter of said wall;

an annular imperforate floor beneath said roof and exposed for direct access to and walking upon by said livestock, said floor extending outwardly from the upper perimeter of said pit toward said wall;

an elongated, radially-extending sweep means, pivotally mounted at the center of said pit for lateral movement circularly around and over said floor, for engaging litter on said floor and propelling litter toward and into said pit;

means for driving said sweep means in said movement and in said propelling of said litter;

a plurality of dividers, extending radially from said pit, that define an annular succession of generally wedge-shaped pens for livestock;

and a plurality of tensioned ties successively spaced around said imperforate floor and individually extending from the inner end portions of said dividers to the outer periphery of said first portion of said roof.

14. A livestock enclosure comprising:

a generally-circular upright wall enclosing a livestock grazing area;

a roof covering the area enclosed by said wall;

a pit located centrally of said area and extending beneath the level of the lower perimeter of said wall;

an annular imperforate floor beneath said roof and exposed for direct access to and walking upon by said livestock, said floor extending outwardly from the upper perimeter of said pit toward said wall;

an elongated, radially-extending sweep means, pivotally mounted at the center of said pit for lateral movement circularly around and over said floor, for engaging litter on said floor and propelling litter toward and into said pit;

means for driving said sweep means in said movement and in said propelling of said litter;

a plurality of dividers, extending radially from said pit, that define an annular succession of generally wedge-shaped pens for livestock;

each of said dividers including a fixed panel the bottom edge of which is spaced above said floor by a distance accommodating movement of said sweep means thereunder together with a swinging panel, hingedly suspended from the bottom edge of said fixed panel, of a weight precluding self-movement of younger ones of said livestock therethrough while permitting movement of said sweep means therethrough.

15. A livestock enclosure comprising:

a generally-circular upright wall enclosing a livestock grazing area;

a roof covering the area enclosed by said wall;

a pit located centrally of said area and exending beneath the level of the lower perimeter of said wall;

an annular imperforate floor beneath said roof and exposed for direct access to and walking upon by said livestock, said floor extending outwardly from the upper perimeter of said pit and toward said wall;

an elongated, radially-extending sweep means, pivotally mounted at the center of said pit for lateral movement circularly around and over said floor, for engaging litter on said floor and propelling litter toward and into said pit;

means for driving said sweep means in said movement and in said propelling of said litter;

a plurality of dividers, extending radially from said pit, that define an annular succession of generally wedge-shaped pens for livestock;

and at least a portion of each of said dividers being moveable in order to accommodate movement of said sweep means thereunder.

16. A livestock enclosure comprising:

a generally-circular upright wall enclosing a livestock grazing area;

a roof covering the area enclosed by said wall;

a pit located centrally of said area and extending beneath the level of the lower perimeter of said wall;

an annular imperforate floor beneath said roof and exposed for direct access to and walking upon by said livestock, said floor extending outwardly from the upper perimeter of said pit toward said wall;

an elongated, radially-extending sweep means, pivotally mounted at the center of said pit for lateral movement circularly around and over said floor, for engaging litter on said floor and propelling litter toward and into said pit;

means for driving said sweep means in said movement and in said propelling of said litter;

a plurality of dividers, extending radially from said pit, that define an annular succession of generally wedge-shaped pens for livestock;

a pole projecting upwardly from said pit, the center of said roof being supported from the upper end of said pole;

and means for suspending the inner ends of said dividers from said pole.

17. A livestock enclosure comprising:

a generally-circular upright wall enclosing a livestock grazing area;

a roof covering the area enclosed by said wall;

a pit located centrally of said area and extending beneath the level of the lower perimeter of said wall;

an annular imperforate floor beneath said roof and exposed for direct access to and walking upon by said livestock, said floor extending outwardly from the upper perimeter of said pit toward said wall;

an elongated, radially-extending sweep means, pivotally mounted at the center of said pit for lateral movement circularly around and over said floor, for engaging litter on said floor and propelling litter toward and into the pit;

means for driving said sweep means in said movement and in said propelling of said litter;

a plurality of dividers, extending radially from said pit, that define an annular succession of generally wedge-shaped pens for livestock;

and said dividers including means for accommodating movement of said sweeping means thereunder, said dividers extending outwardly only to the outer perimeter of said imperforate floor, and means defining nesting regions under said roof and outwardly of said imperforate floor.

18. A livestock enclosure comprising:
a generally-circular upright wall enclosing a livestock rasinging area;
a roof covering the area enclosed by said wall;
a pit located centrally of said area and extending beneath the level of the lower perimeter of said wall;
an annular floor beneath said roof and extending outwardly from the upper perimeter of said pit toward said wall;
means enabling the engaging and propelling of litter from said floor into said pit;
and an annular nesting region under said roof within said wall and surrounding said floor.

19. An enclosure as defined in claim 18 in which said nesting region is floored at a level stepped above that of the level of said annular floor.

20. An enclosure as defined in claim 18 which further includes an upright chimney disposed in said roof above said pit, a plurality of openings distributed around said upright wall, and means for enabling the circulation of air between said chimney and said openings in the conditioning of said nesting region for encouraging said livestock to defecate only on said annular floor.

* * * * *

UNITED STATES PATENT OFFICE
CERTIFICATE OF CORRECTION

PATENT NO. : 3,919,976
DATED : November 18, 1975
INVENTOR(S) : Clarence J. Meyer and Daniel J. Meyer It is certified that error appears in the above-identified patent and that said Letters Patent are hereby corrected as shown below:

At each of Column 9, lines 5 and 45, Column 10, lines 25 and 54, Column 11, lines 14, 40 and 68 and Column 12, lines 24 and 49, change "grazing" to read -- raising --. This corresponds to making that change in the third line of each of Claims 3, 8, 11, 12, 13, 14, 15, 16 and 17.

At Column 9, lines 7 and 8, change "between" to read -- beneath --.

Signed and Sealed this

Twenty-third Day of November 1976

[SEAL]

Attest:

RUTH C. MASON
Attesting Officer

C. MARSHALL DANN
Commissioner of Patents and Trademarks